Aug. 11, 1942.  W. A. DE SMIDT  2,292,619
MOUNTING BRACKET FOR ELECTRICAL CONTROL DEVICES
Filed Aug. 1, 1940
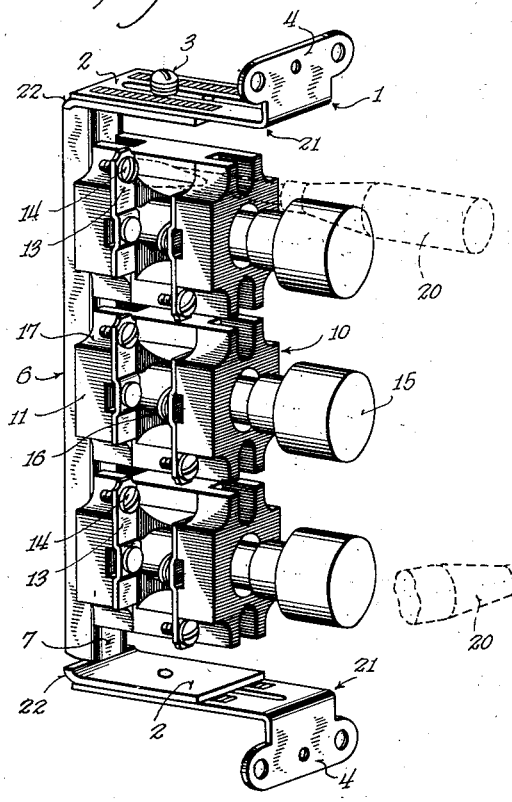
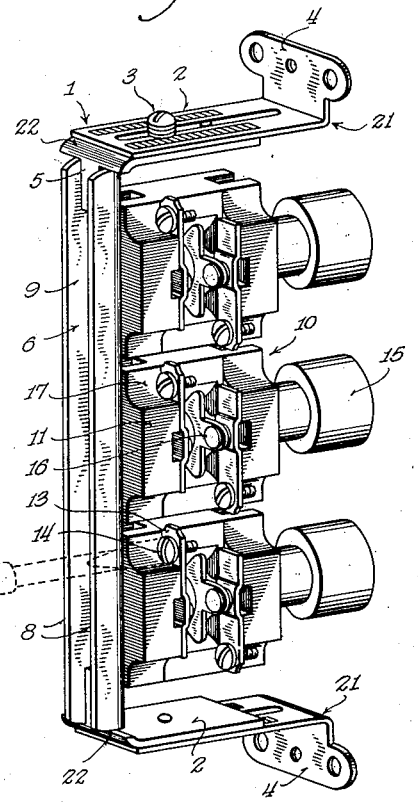
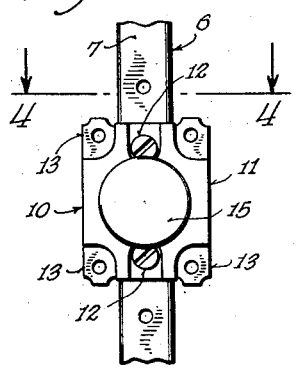
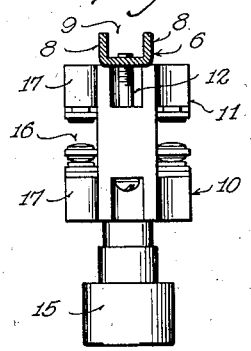
INVENTOR.
WOODROW A. DESMIDT
BY
*Walter S. Pfeifer*
ATTORNEY.

Patented Aug. 11, 1942

2,292,619

UNITED STATES PATENT OFFICE 2,292,619

MOUNTING BRACKET FOR ELECTRICAL CONTROL DEVICES

Woodrow A. De Smidt, Milwaukee, Wis., assignor to Allen-Bradley Company, Milwaukee, Wis., a corporation of Wisconsin Application August 1, 1940, Serial No. 349,374

6 Claims. (Cl. 200—168)

This invention relates to an improved mounting frame for electrical control devices, such as, push button stations, selector switches and pilot lights.

In industrial electrical control installations, it is frequently required that there be one or more control stations. These control stations vary in complexity from the conventional self contained start and stop control station to those involving a multiplicity of push button switches such as forward, reverse, start, stop, slow, fast, inch, selector switches and signal lights. This invention is directed to the latter class of control stations wherein a plurality of control devices are grouped on a mounting frame suitable for attaching to a control panel and providing for wiring and inspection from either the front or rear of the control panel.

It is the object of this invention to provide an improved mounting frame for electrical control devices equally adapted for mounting from the front or rear of panels of a wide range of thickness and permitting wiring and inspection of the control devices from either front or rear of the panel.

A further object of this invention is to provide an improved mounting frame having a structure providing the aforementioned features that is simple and economical to manufacture.

Referring to the attached drawing forming a part of this specification:

Figure 1 is a front perspective view of the mounting frame and three push button stations showing the accessibility of the terminals from the front of the device;

Figure 2 is a rear perspective view of the mounting frame and three push button stations showing the accessibility of the terminals from the rear of the device;

Figure 3 is a front plan view of one of the push button stations mounted on the back section of the mounting frame; and Figure 4 is a view taken along the line 4—4 in Figure 3.

The U-shaped mounting frame 1 includes an elongated narrow back section 6 and an adjustable Z bracket 2 attached to each end of back section 6. Back section 6 is constructed of a channel section having a mounting face 7 facing the interior of the frame disposed at right angles to the plane of the U-shaped mounting frame, sides 8—8 at right angles to the mounting face and an elongated recess 9 facing the rear of the frame. Each adjustable Z bracket 2 includes an angle bracket 22 having a tongue 5 set in recess 9 and riveted to the back section 6 and another angle bracket 21 attached to angle bracket 22 by means of a lock-screw to form an adjusting means 3 whereby the effective length of the Z bracket 2 can be readily altered. The angle bracket 21 has the free end 4 formed as a flange to serve as a panel mounting means. This adjustment of the bracket 2 provides for mounting the flange 4 on the front face of the panel or on the rear face of panels up to 1⅛" in this particular instance.

A plurality of push button stations 10 are attached to the mounting face 7 by means of mounting screws 12. The push button station 10 includes a base 11 having width substantially greater than the width of back section 6 and cut-out corners or notches 17 providing front and rear panel accessibility to terminals 13. Terminals 13 are mounted to base 11 and are spaced slightly beyond sides 8 of back section 6 and within the width of the base 11. The base 11 also mounts the actuating push button 15 and associated switch mechanism 16.

The push button control stations shown in Figure 1 have terminals 13 fitted with terminal screws 14 arranged for accessibility from the front of the device as shown by means of screw driver 20. When accessibility from the rear is desired, the terminal screws 14 are reversed in the terminals 13 as shown in Figure 2. It is also apparent that front and rear accessibility can be provided for in an assembly of a plurality of control devices by having certain terminals facing the front of the device and others facing the rear of the device.

Heretofore two types of mounting frames have been furnished for this class of service. When it was required that the wiring be done from the front of the control panel, a frame was supplied in which the control devices were mounted from their bases completely obstructing accessibility from the rear. When it was required that the wiring be done from the rear of the control panel, a frame was supplied in which the control devices were mounted from their front faces completely obstructing accessibility from the front. In some instances, accessibility was provided for from the sides by the use of angularly disposed terminals.

By constructing the back supporting frame of narrow channel section and mounting control devices thereon having properly positioned terminals, a new structural combination is obtained having great utility in the electrical control art. With my invention, control devices having terminals for front and rear panel wiring properly spaced to provide a narrow mounting face can be mounted to a narrow mounting means, such as a channel iron thus providing a mounted switch structure having front and rear panel accessibility for wiring and inspection.

The mounting frame and attached electric control devices represent a significant improvement in control station mounting frames suitable for mounting to electric control panels. The frame is substantially U-shaped and includes an elongated narrow back section disposed to be spaced from and parallel to a control panel and two legs each including a mounting bracket having a panel mounting means. The back section is of channel section in the preferred form shown having width at right angles to the plane of the U-frame slightly less than the spacing between the oppositely positioned terminals of the control device. This combination of structural elements of the frame and control device provide for equal accessibility for front panel or rear panel wiring.

What I claim as my invention is:

1. The combination of a supporting frame and an attached electric control device suitable for mounting to an electric control panel comprising, a U-shaped supporting frame including an elongated narrow back section and two legs each having a panel mounting means, said back section having width at right angles to the plane of said U providing a narrow mounting face and said mounting face spaced from and parallel to said panel, each of said two legs attached to opposite ends of said back section and said panel mounting means attached to the ends of said legs opposite the ends attached to said back section, said panel mounting means positioned to leave the open side of said U-shaped supporting frame unobstructed, and an electric control device mounted on said mounting face facing said mounting panel and having terminals accessible from the front or rear of said device spaced on opposite sides of said back section with the spacing of said terminals greater than the width of said back section to provide accessibility for front panel or rear panel wiring.

2. The combination of a supporting frame and an attached electric control device suitable for mounting to an electric control panel comprising, a U-shaped supporting frame including an elongated narrow back section and two legs each having a panel mounting means, said back section having a narrow mounting face spaced from and parallel to said panel and having two spaced sides at right angles to said mounting face, each of said two legs attached to opposite ends of said back section and said panel mounting means attached to the ends of said legs opposite the ends attached to said back section, said panel mounting means positioned to leave the open side of said U-shaped supporting frame unobstructed, and an electric control device mounted on said mounting face facing said mounting panel and having terminals accessible from the front or rear of said device spaced beyond said sides of said back section to provide accessibility for front panel or rear panel wiring.

3. The combination of a supporting frame and an attached electric control device suitable for mounting to an electric control panel comprising, a U-shaped supporting frame including an elongated narrow back section and two legs each having a panel mounting means, said back section having width at right angles to the plane of said U providing a narrow mounting face and said mounting face spaced from and parallel to said panel, each of said two legs attached to opposite ends of said back section and said panel mounting means attached to the ends of said legs opposite the ends attached to said back section, said panel mounting means positioned to leave the open side of said U-shaped supporting frame unobstructed, and an electric control device mounted on said mounting face facing said mounting panel, said device having width at right angles to the plane of said U substantially greater than the width of said back section, and said device having terminals accessible from the front or rear of said device spaced on opposite sides of said back section with the spacing of said terminals greater than the width of said back section to provide accessibility for front panel or rear panel wiring.

4. The combination of a supporting frame and an attached electric control device suitable for mounting to an electric control panel comprising, a U-shaped supporting frame including an elongated narrow back section and two legs each having a panel mounting means, said back section having width at right angles to the plane of said U providing a narrow mounting face having two spaced sides at right angles to said face and said mounting face spaced from and parallel to said panel, each of said two legs attached to opposite ends of said back section and said panel mounting means attached to the ends of said legs opposite the ends attached to said back section, said panel mounting means positioned to leave the open side of said U-shaped supporting frame unobstructed, and an electric control device mounted on said mounting face facing said mounting panel, said device having width at right angles to the plane of said U substantially greater than the width of said back section, and said device having terminals accessible from the front or rear of said device spaced within the width of said device and beyond said sides of said back section to provide accessibility for front panel or rear panel wiring.

5. The combination of a supporting frame and an attached electric control device suitable for mounting to an electric control panel comprising, a U-shaped supporting frame including an elongated narrow back section and two legs each having a panel mounting means, said back section having width at right angles to the plane of said U providing a narrow mounting face having two spaced sides at right angles to said face and said mounting face spaced from and parallel to said panel, each of said two legs attached to opposite ends of said back section and said panel mounting means attached to the ends of said legs opposite the ends attached to said back section, said panel mounting means positioned to leave the open side of said U-shaped supporting frame unobstructed, and an electric control device mounted on said mounting face facing said mounting panel, said device having width at right angles to the plane of said U substantially greater than the width of said back section, and said device including a base member having notches with terminals positioned therein accessible from the front or rear of said device, and said terminals in the mounted position of said device on said mounting face being spaced beyond said sides of said back section to provide accessibility for front panel or rear panel wiring.

6. The combination of a supporting frame and an attached electric control device suitable for mounting to an electric control panel comprising, a U-shaped supporting frame including an elongated narrow back section and two legs each having a panel mounting means, said back section being of channel section with the width of said channel at right angles to the plane of said U providing a narrow mounting face and said mounting face spaced from and parallel to said panel, each of said two legs attached to opposite ends of said back section and said panel mounting means attached to the ends of said legs opposite the ends attached to said back section, said panel mounting means positioned to leave the open side of said U-shaped supporting frame unobstructed, and an electric control device mounted on said mounting face facing said mounting panel and having terminals accessible from the front or rear of said device spaced on opposite sides of said back section with the spacing of said terminals greater than the width of said back section to provide accessibility for front panel or rear panel wiring.

WOODROW A. DE SMIDT.